(12) United States Patent
Iwamura et al.

(10) Patent No.: US 10,757,441 B2
(45) Date of Patent: Aug. 25, 2020

(54) ENCODING DEVICE, DECODING DEVICE, AND PROGRAM

(71) Applicant: NIPPON HOSO KYOKAI, Shibuya-ku, Tokyo (JP)

(72) Inventors: Shunsuke Iwamura, Tokyo (JP); Atsuro Ichigaya, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

(21) Appl. No.: 16/455,097

(22) Filed: Jun. 27, 2019

(65) Prior Publication Data

US 2019/0342575 A1 Nov. 7, 2019

Related U.S. Application Data

(63) Continuation of application No. PCT/JP2017/047137, filed on Dec. 27, 2017.

(30) Foreign Application Priority Data

Dec. 28, 2016 (JP) .................................. 2016-255336

(51) Int. Cl.
*H04N 19/119* (2014.01)
*H04N 19/52* (2014.01)
(Continued)

(52) U.S. Cl.
CPC ........... *H04N 19/53* (2014.11); *H04N 19/119* (2014.11); *H04N 19/139* (2014.11);
(Continued)

(58) Field of Classification Search
CPC .............................. H04N 19/53; H04N 19/119
See application file for complete search history.

(56) References Cited

U.S. PATENT DOCUMENTS 8,861,616 B2 * 10/2014 Yie ...................... H04N 19/176
375/240.26
9,357,218 B2 * 5/2016 Park ...................... H04N 19/159
(Continued)

FOREIGN PATENT DOCUMENTS

JP 2013-123218 A 6/2013
JP 2013-131917 A 7/2013
(Continued)

OTHER PUBLICATIONS

J.An, et al. "Block partitioning structure for next generation video coding" International Telecommunication Union, Telecommunication Standardization Sector, Study Period 2013-2016, Sep. 2015, 8 pages.
(Continued)

*Primary Examiner* — Irfan Habib
(74) *Attorney, Agent, or Firm* — Brinks Gilson & Lione

(57) ABSTRACT

An encoding device, configured to divide an original image of a frame unit constituting a moving image into blocks and encode the blocks, includes a list generator configured to generate a list including motion vector candidates of a block to be encoded, based on a divided shape of the block to be encoded, and a divided shape and a motion vector of an adjacent block adjacent to the block to be encoded; and an encoder configured to encode a motion vector of the block to be encoded, based on the list. The list generator is configured so as not to add, to the list, a motion vector of a same hierarchy adjacent block which is a same hierarchy block adjacent to the block to be encoded, when the block to be encoded and the same hierarchy adjacent block are integrable. The same hierarchy block is a block that has the same width and height as the block to be encoded and has existed in the same block as the block to be encoded before being finally divided.

8 Claims, 15 Drawing Sheets

(51) Int. Cl.
*H04N 19/53* (2014.01)
*H04N 19/139* (2014.01)
*H04N 19/176* (2014.01)
*H04N 19/56* (2014.01)

(52) U.S. Cl.
CPC .......... *H04N 19/176* (2014.11); *H04N 19/52* (2014.11); *H04N 19/56* (2014.11)

(56) References Cited

U.S. PATENT DOCUMENTS

| | | | | |
|---|---|---|---|---|
| 9,591,327 | B2* | 3/2017 | Lee | H04N 19/105 |
| 9,729,873 | B2* | 8/2017 | Wang | H04N 19/52 |
| 9,807,427 | B2* | 10/2017 | Helle | H04N 19/52 |
| 10,187,657 | B2* | 1/2019 | Park | H04N 19/119 |
| 10,306,258 | B2* | 5/2019 | Bankoski | H04N 19/52 |
| 10,448,010 | B2* | 10/2019 | Chen | H04N 19/176 |
| 10,609,385 | B2* | 3/2020 | Winken | H04N 19/103 |
| 2013/0272412 | A1* | 10/2013 | Seregin | H04N 19/593 |
| | | | | 375/240.16 |
| 2013/0287116 | A1* | 10/2013 | Helle | H04N 19/196 |
| | | | | 375/240.24 |
| 2014/0294088 | A1* | 10/2014 | Sung | H04N 19/96 |
| | | | | 375/240.16 |
| 2015/0098509 | A1* | 4/2015 | Sung | H04N 19/119 |
| | | | | 375/240.16 |
| 2015/0288983 | A1* | 10/2015 | Koo | H04N 19/56 |
| | | | | 375/240.12 |
| 2016/0050429 | A1* | 2/2016 | Heo | H04N 19/513 |
| | | | | 375/240.16 |
| 2017/0142438 | A1* | 5/2017 | Hepper | H04N 19/122 |
| 2019/0342575 | A1* | 11/2019 | Iwamura | H04N 19/53 |

FOREIGN PATENT DOCUMENTS

| | | |
|---|---|---|
| JP | 2013-545342 A | 12/2013 |
| JP | 2016-187134 A | 10/2016 |

OTHER PUBLICATIONS

Iwamura et al., "Partition-adaptive merge candidate derivation", Joint Video Exploration Team (JVET) of ITU-T SG 16 WP 3 and ISO/IEC JTC 1/SC 29/WG 11, 4$^{th}$ Meeting: Chengdu, CN, Oct. 15-21, 2016, Document JVET-D0107, (XP30150350A), 5 pages.

Jianle et al., "Algorithm Description of Joint Exploration Test Model 4", Joint Video Exploration Team (JVET) of ITU-T SG 16 WP 3 and ISO/IEC JTC 1/SC 29/WG 11, 4$^{th}$ Meeting: Chengdu, CN, Oct. 15-21, 2016, Document JVET-D1001 v1 (XP30150460A), 38 pages.

* cited by examiner

FIG. 2
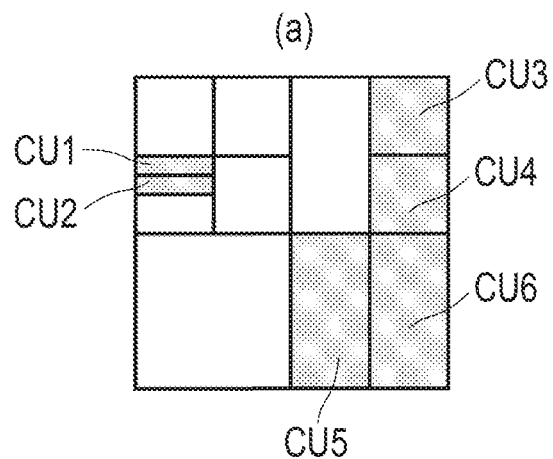
(a)
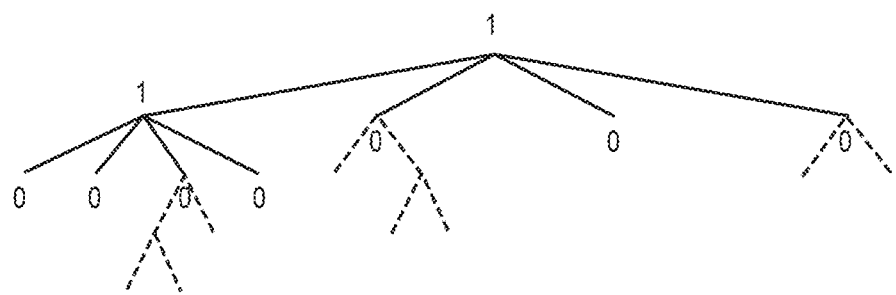
(b)
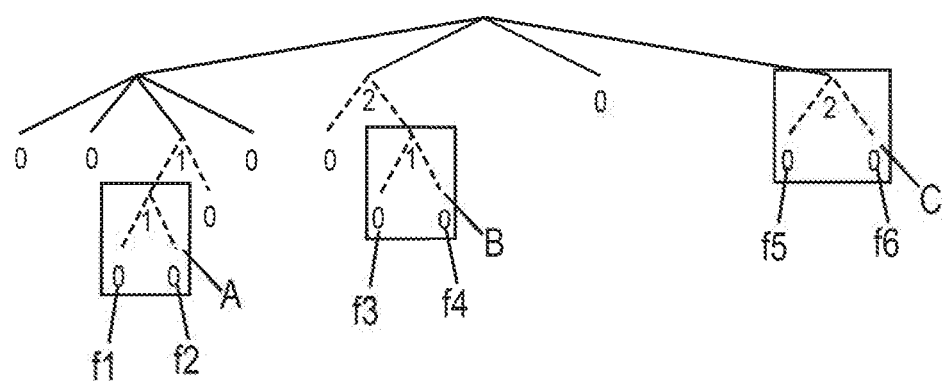
(c)

FIG. 18
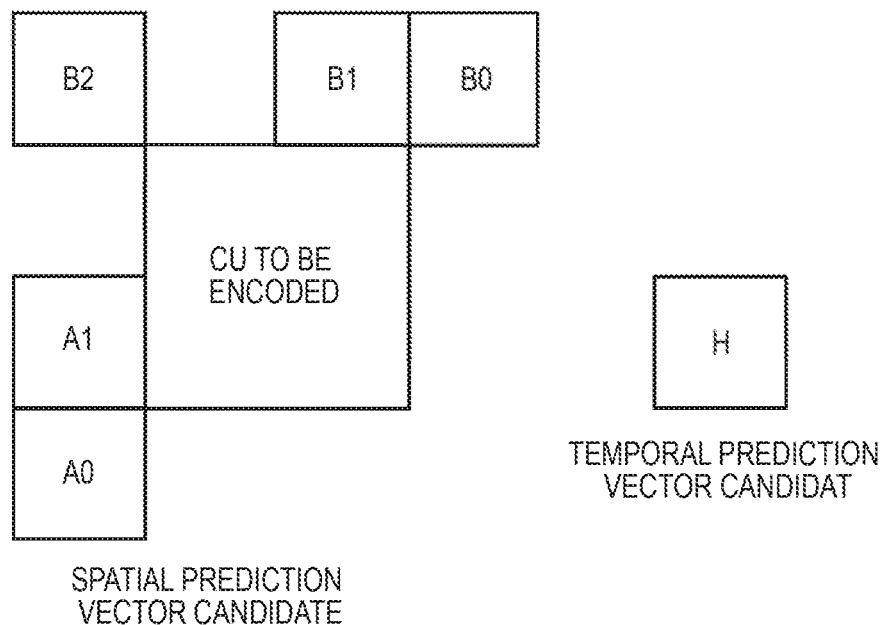
FIG. 19
(a)                    (b)
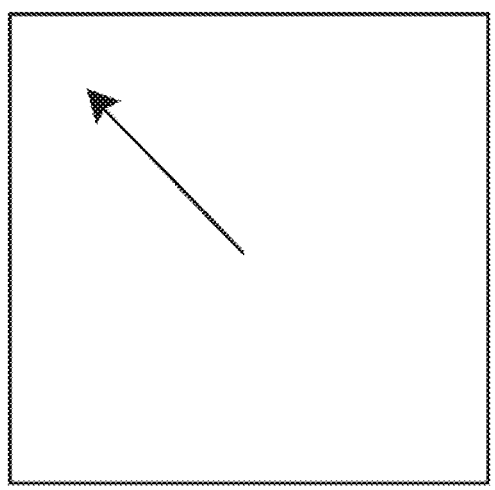 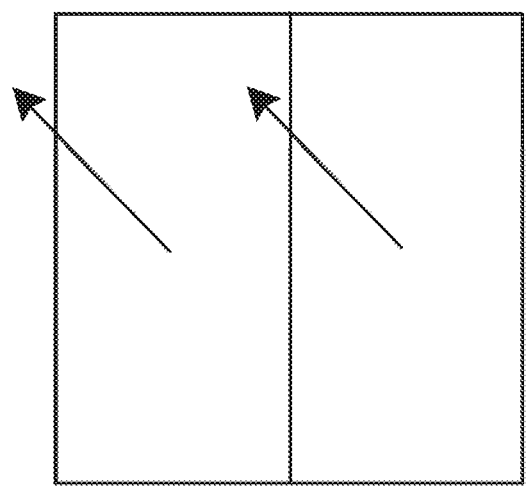

ENCODING DEVICE, DECODING DEVICE, AND PROGRAM

RELATED APPLICATIONS

This application is a continuation application of international application PCT/JP2017/047137, filed Dec. 27, 2017, which claims the benefit of Japanese Patent Application No. 2016-255336 filed Dec. 28, 2016, the entire contents of which are incorporated herein by reference.

BACKGROUND OF THE INVENTION

1. Field of the Invention

The present disclosure relates to an encoding device, a decoding device, and a program.

2. Description of the Related Art

A moving image (video) coding system represented by H.265/high efficiency video coding (HEVC) is configured to generate residual signals by performing a prediction while switching two types of predictions of an inter-prediction using a temporal correlation between the frames and an intra-prediction using a spatial correlation in the frame, and then output streams obtained by performing an orthogonal transformation processing, a loop filter processing, or an entropy encoding processing.

In the inter-prediction of the HEVC, a motion vector is used to generate a predictive image. In addition, in order to transmit the motion vector to a decoding device (decoder), two types of vector prediction methods such as an adaptive motion vector prediction mode and a merge mode are prepared.

In the HEVC, division into a coding tree unit (CTU) which is a block of the largest unit for encoding an original image of the frame unit constituting the moving image is performed, and the encoding processing is performed in the raster order from the upper left. The CTU can also perform hierarchical quad-tree division on a block called a coding unit (CU), and is divided according to the decision of an encoding device (encoder).

For example, the encoding device determines to perform the encoding processing in a large block unit in a flat region and to perform the encoding processing in a small block unit in a region having a complicated texture in accordance with a pattern of a block to be encoded. In this way, it is possible to reduce the amount of information required for transmission of flag information or orthogonal transformation coefficients required for each block by performing the encoding processing at a variable block size in the encoding device.

However, it is necessary to repeatedly perform the quad-tree division in the case in which the block division is performed adaptively on the pattern in the case in which the texture region exists in a small part of the flat region. However, since the block division is performed, there is a problem that the block division is performed even for the flat region that does not need to be subjected to the block division and the amount of information required for transmission of the flag information is increased, thereby reducing the encoding efficiency.

For example, as shown in FIG. 17(a), even if a partial texture X exists in the block, it is necessary to perform the quad-tree division even on the flat region A on the right side in the block because the quad-tree division is repeated hierarchically, and the amount of information is thus increased.

In order to solve such a problem, Non Patent Literature 1 makes it possible to apply a binary tree division that is performed horizontally or vertically in a hierarchical manner in addition to the hierarchical quad-tree division of the CU specified by the HEVC, thereby enabling the division which is more adaptive to the pattern.

For example, as shown in FIG. 17(b), by applying the binary tree division, the block size in the flat region A becomes larger than that of the quad-tree division, thereby making it possible to reduce the amount of information required for transmission of the flag information or the orthogonal transformation coefficients.

However, in the inter-prediction, the predictive image is generated by performing the inter-prediction according to the motion vector determined by the encoding device, and the information of the applied motion vector is transmitted to the decoding device, thereby generating and decoding the same predictive image by the decoding device.

In the HEVC, in order to reduce the amount of information required for transmission of the motion vector when the merge mode is applied, a prediction vector list is generated by setting a motion vector that is applied to a plurality of surrounding CUs as a motion vector candidate and a motion vector of a CU to be encoded is predicted using the motion vector in the list.

In the merge mode in the HEVC, when the motion vector of the CU to be coded is the same as the motion vector in the prediction vector list, the amount of information to be transmitted is further reduced by transmitting only an index of the prediction vector list.

In the HEVC, the prediction vector list stores five prediction vectors in the order specified in advance from spatial prediction vector candidates A0/A1/B0/B1/B2 and a temporal prediction vector candidate H as shown in FIG. 18.

As shown in FIG. 18, the spatial prediction vector candidates A0/A1/B0/B1/B2 are motion vectors of the CU located on an upper side or a left side of the CU to be encoded, and the temporal prediction vector candidate H is a motion vector of a block of a different frame near the same coordinate of the CU to be encoded.

In the merge mode, the flag information indicating whether or not the motion vector to be applied to the CU to be encoded is included in the prediction vector list, and the index information indicating which number of prediction vector of the prediction vector list if the motion vector is included are transmitted.

In addition, in the HEVC, in the merge mode in which the motion vectors of adjacent CUs are reused, a skip mode in which a residual signal is set to 0 and no orthogonal transformation processing or quantization processing is performed is separately prepared. The skip mode is only a mode to transmit only a skip flag indicating whether or not the mode is the skip mode and the index information.

SUMMARY OF THE INVENTION

As described in Non Patent Literature 1, it is unlikely that the same motion vector as that of the surrounding CU will be selected because it is possible to select an optimum block division for a pattern when a binary tree division can be applied.

For example, in the case in which the entire region of the CU to be encoded moves uniformly, as shown in FIG. 19(a), when block division (binary tree division) is not performed, it is only necessary to transmit information on a motion vector and an orthogonal transformation coefficient of the CU to be encoded. On the other hand, as shown in FIG. 19(b), when a binary tree division is performed vertically, the amount of information to be transmitted is increased because it is necessary to transmit the information on the motion vector and the orthogonal transformation coefficient of each divided CU, and it is thus unlikely that a divided shape as shown in FIG. 19(b) is selected by an encoding device. In other words, when such a binary tree divided shape is selected, there is a high possibility that the motion vectors are different on the left and right CUs.

However, in Non Patent Literature 1, since a prediction vector list is generated without considering the tendency of the motion vector in the binary tree division described above, there is a problem that efficiency of prediction of the motion vector by a merge mode is deteriorated.

Therefore, the present disclosure has been made in order to solve the above-mentioned problems, and an object of the present disclosure is to provide an encoding device, a decoding device, and a program that can improve prediction efficiency of a motion vector to improve encoding efficiency by generating a prediction vector list according to a divided shape of a block to be encoded.

In addition, an object of the present disclosure is to provide an encoding device, a decoding device, and a program that can reduce a transmission information amount of flags related to a skip mode to improve encoding efficiency.

A first aspect of the present disclosure is summarized as an encoding device configured to divide an original image of a frame unit constituting a moving image into blocks and encode the blocks. The encoding device includes a list generator configured to generate a list including motion vector candidates of a block to be encoded, based on a divided shape of the block to be encoded, and a divided shape and a motion vector of an adjacent block adjacent to the block to be encoded; and an encoder configured to encode a motion vector of the block to be encoded, based on the list. The list generator is configured so as not to add, to the list, a motion vector of a same hierarchy block which is a block that has the same width and height as the block to be encoded and has existed in the same block as the block to be encoded before being finally divided.

A second aspect of the present disclosure is summarized as an encoding device configured to divide an original image of a frame unit constituting a moving image into blocks and encode the blocks. The encoding device includes a determiner configured to determine whether or not a residual signal is transmitted in a block to be encoded, based on a divided shape and a motion vector of the block to be encoded, and a divided shape and a motion vector of an adjacent block adjacent to the block to be encoded; and an encoder configured to encode the motion vector of the block to be encoded without encoding information indicating that the residual signal is not transmitted in the block to be encoded, based on the determination. When the residual signal is not transmitted in the same hierarchy block which is a block that has the same width and height as the block to be encoded and has existed in the same block as the block to be encoded before being finally divided, and the motion vector of the block to be encoded and a motion vector of the same hierarchy adjacent block are the same as each other, the determiner is configured to determine that the residual signal is transmitted in the block to be encoded.

A third aspect of the present disclosure is summarized as a decoding device configured to divide an original image of a frame unit constituting a moving image into blocks to be encoded and decode the blocks. The decoding device includes a list generator configured to generate a list including motion vector candidates of a block to be encoded, based on a divided shape of the block to be encoded, and a divided shape and a motion vector of an adjacent block adjacent to the block to be encoded; and an inter-predictor configured to generate a predictive image based on a motion vector of the block to be encoded extracted based on the list. The list generator is configured so as not to add, to the list, a motion vector of a same hierarchy block which is a block that has the same width and height as the block to be encoded and has existed in the same block as the block to be encoded before being finally divided.

A fourth aspect of the present disclosure is summarized as a decoding device configured to divide an original image of a frame unit constituting a moving image into blocks to be encoded and decode the blocks. The decoding device includes a decoder configured so as not to decode information indicating that a residual signal is not transmitted in the block to be encoded; a determiner configured to determine whether or not the residual signal is transmitted in the block to be encoded, based on a divided shape and a motion vector of the block to be encoded, and a divided shape and a motion vector of an adjacent block adjacent to the block to be encoded; and a decoded image generator configured to generate a decoded image of the block to be encoded, based on the determination. When the residual signal is not transmitted in the same hierarchy block which is a block that has the same width and height as the block to be encoded and has existed in the same block as the block to be encoded before being finally divided, and the motion vector of the block to be encoded and a motion vector of the same hierarchy adjacent block are the same as each other, the determiner is configured to determine that the residual signal is transmitted in the block to be encoded.

A fifth aspect of the present disclosure is summarized as an encoding device configured to divide an original image of a frame unit constituting a moving image into blocks and encode the blocks. The encoding device includes a list generator configured to generate a list including motion vector candidates of a block to be encoded, based on a divided shape of the block to be encoded, and a divided shape and a motion vector of an adjacent block adjacent to the block to be encoded; and an encoder configured to encode a motion vector of the block to be encoded, based on the list. The list generator is configured so as not to add, to the list, a motion vector of a same hierarchy adjacent block which is a same hierarchy block adjacent to the block to be encoded, when the block to be encoded and the same hierarchy adjacent block are integrable. The same hierarchy block is a block that has the same width and height as the block to be encoded and has existed in the same block as the block to be encoded before being finally divided.

A sixth aspect of the present disclosure is summarized as an encoding device configured to divide an original image of a frame unit constituting a moving image into blocks and encode the blocks. The encoding device includes a determiner configured to determine whether or not a residual signal is transmitted in a block to be encoded, based on a divided shape and a motion vector of the block to be encoded, and a divided shape and a motion vector of an adjacent block adjacent to the block to be encoded; and an encoder configured to encode the motion vector of the block to be encoded without encoding information indicating that the residual signal is not transmitted in the block to be encoded, based on the determination. When the block to be encoded and a same hierarchy adjacent block which is a same hierarchy block adjacent to the block to be encoded, are integrable, the residual signal is not transmitted in the same hierarchy adjacent block, and the motion vector of the block to be encoded and a motion vector of the same hierarchy adjacent block are the same as each other, the determiner is configured to determine that the residual signal is transmitted in the block to be encoded. The same hierarchy block is a block that has the same width and height as the block to be encoded and has existed in the same block as the block to be encoded before being finally divided.

A seventh aspect of the present disclosure is summarized as a decoding device configured to divide an original image of a frame unit constituting a moving image into blocks to be encoded and decode the blocks. The decoding device includes a list generator configured to generate a list including motion vector candidates of a block to be encoded, based on a divided shape of the block to be encoded, and a divided shape and a motion vector of an adjacent block adjacent to the block to be encoded; and an inter-predictor configured to generate a predictive image based on a motion vector of the block to be encoded extracted based on the list. The list generator is configured so as not to add, to the list, a motion vector of a same hierarchy adjacent block which is a same hierarchy block adjacent to the block to be encoded, when the block to be encoded and the same hierarchy adjacent block, are integrable. The same hierarchy block is a block that has the same width and height as the block to be encoded and has existed in the same block as the block to be encoded before being finally divided.

An eighth aspect of the present disclosure is summarized as a decoding device configured to divide an original image of a frame unit constituting a moving image into blocks to be encoded and decode the blocks. The decoding device includes a decoder configured so as not to decode information indicating that a residual signal is not transmitted in the block to be encoded; a determiner configured to determine whether or not the residual signal is transmitted in the block to be encoded, based on a divided shape and a motion vector of the block to be encoded, and a divided shape and a motion vector of an adjacent block adjacent to the block to be encoded; and a decoded image generator configured to generate a decoded image of the block to be encoded, based on the determination. When the block to be encoded and a same hierarchy adjacent block which is a same hierarchy block adjacent to the block to be encoded, are integrable, the residual signal is not transmitted in the same hierarchy adjacent block, and the motion vector of the block to be encoded and a motion vector of the same hierarchy adjacent block are the same as each other, the determiner is configured to determine that the residual signal is transmitted in the block to be encoded. The same hierarchy block is a block that has the same width and height as the block to be encoded and has existed in the same block as the block to be encoded before being finally divided.

A ninth aspect of the present disclosure is summarized as a program for causing a computer to function as the encoding device according to any one of first, second, fifth, or sixth aspect.

A tenth aspect of the present disclosure is summarized as a program for causing a computer to function as the decoding device according to any one of third, fourth, seventh, and eighth aspect.

According to the present disclosure, the encoding device, the decoding device, and the program that can improve the prediction efficiency of the motion vector and improve the encoding efficiency by generating the prediction vector list corresponding to the divided shape of the block to be encoded can be provided.

In addition, according to the present disclosure, the encoding device, the decoding device, and the program that can reduce the transmission information amount of flags according to the skip mode to improve the encoding efficiency can be provided.

BRIEF DESCRIPTION OF DRAWINGS

FIG. 2 is a diagram illustrating an example of a method of generating flags indicating a divided shape of a CU to be encoded by a block divider 11 in the encoding device 1 according to the first embodiment.

FIG. 18 is a diagram for explaining the conventional technology.

FIG. 19 is a diagram for explaining the conventional technology.

DETAILED DESCRIPTION OF THE PREFERRED EMBODIMENTS

First Embodiment

Hereinafter, an encoding device 1 and a decoding device 3 according to a first embodiment of the present disclosure will be described with reference to FIGS. 1 to 6.

Here, the encoding device 1 and the decoding device 3 according to the present embodiment are configured to correspond to an inter-prediction in a moving image encoding system such as HEVC. Here, the encoding device 1 and the decoding device 3 according to the present embodiment are configured so as to be able to correspond to an arbitrary moving image encoding system as long as it is the moving image encoding system performing the inter-prediction. In addition, in the encoding device 1 and the decoding device 3 according to the present embodiment, a case in which a merge mode in the HEVC is applied will be described as an example.

In addition, in the specification, claims, drawings and abstract, unless otherwise specified, the expression "motion vector" shall include information that accompanies a value indicating a vector, such as a reference index indicating a reference frame, as well as a value indicating a vector such as [x, y].

The encoding device 1 according to the present embodiment is configured to divide an original image of a frame unit constituting a moving image into blocks to be encoded and encode the blocks to be encoded. Hereinafter, the present embodiment describes a case in which the original image of the frame unit constituting the moving image is divided into CUs to be encoded by a binary tree division and the CUs to be encoded are encoded, as an example, but is also applicable to a case in which the original image of the frame unit constituting the moving image is divided into the CUs to be encoded by a quad-tree division and the CUs to be encoded are encoded.

Hereinafter, for the sake of simplicity of the description, as illustrated in FIG. 19(b), two blocks having the same width and height generated by performing the binary tree division (two blocks that have existed in the same block before being finally divided) are called the same hierarchy block.

Figure 20:
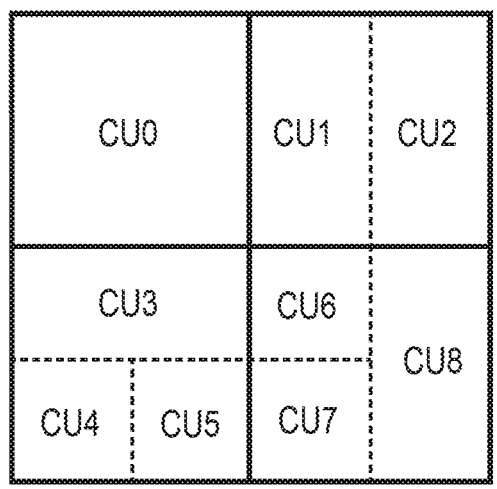
FIG. 20 is a diagram for explaining the same hierarchy block.

In FIG. 20, CU1 and CU2 are called the same hierarchy CU, CU4 and CU5 are called the same hierarchy CU, and CU6 and CU7 are called the same hierarchy CU. In addition, in CU3, since CUs adjacent to a lower side of CU3 are further divided by the binary tree division and have the block size different from that of CU3, CU3 and CU4, or CU3 and CU5 are not called the same hierarchy CU. In addition, like CU2 and CU8 or CU5 and CU7. CUs that have the same width or height, but did not exist in the same CU before being finally divided are also not called the same hierarchy CU.

Figure 1:
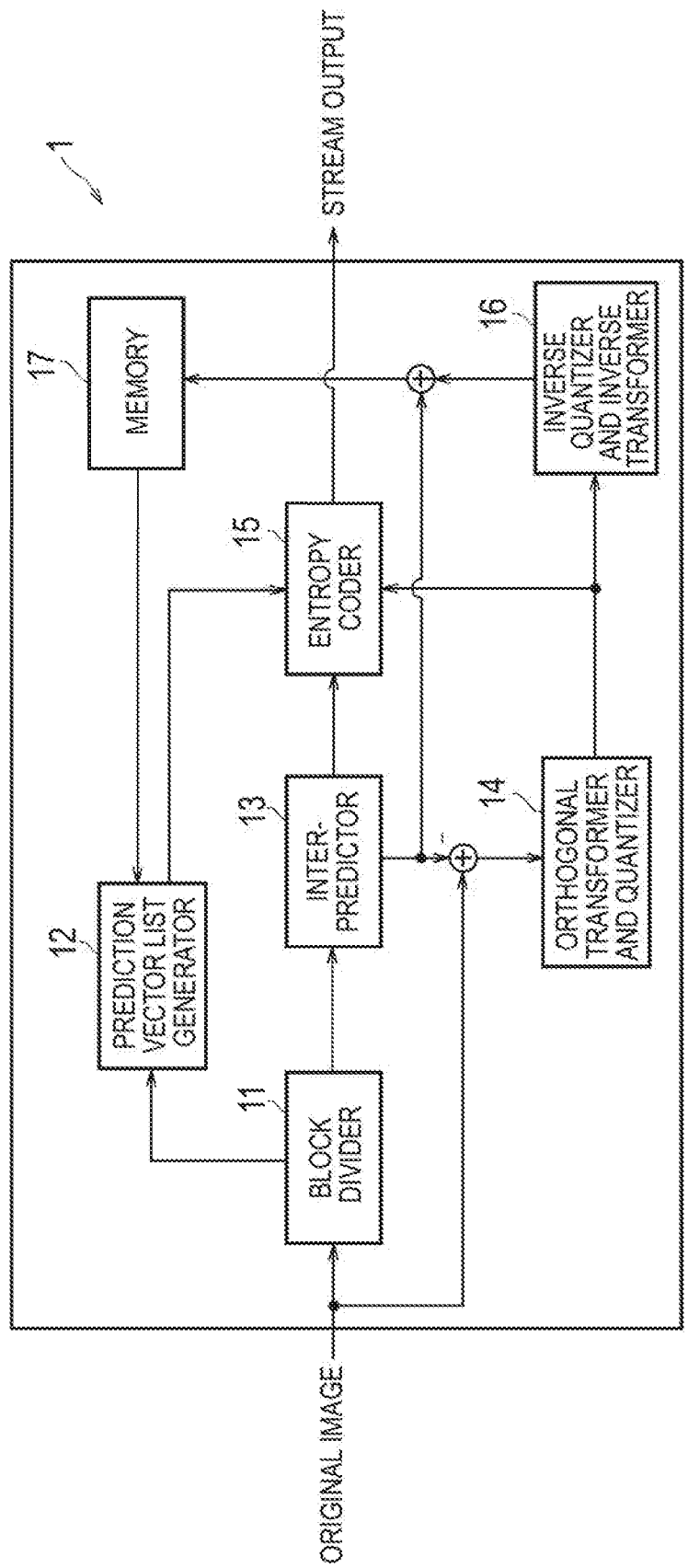
FIG. 1 is a diagram illustrating an example of functional blocks of an encoding device 1 according to a first embodiment.

As illustrated in FIG. 1, the encoding device 1 according to the present embodiment includes a block divider 11, a prediction vector list generator 12, an inter-predictor 13, an orthogonal transformer and quantizer 14, an entropy coder 15, an inverse quantizer and inverse transformer 16, and a memory 17.

The block divider 11 is configured to perform a quad-tree division or a binary tree division for each CU to be encoded, and to output flags indicating a divided shape of the CU to be encoded to the prediction vector list generator 12, or the inter-predictor 13 and the entropy coder 15.

The block divider 11 may preliminarily specify the applicable block size or the maximum number of hierarchies of the quad-tree division, and the applicable block size or the maximum number of hierarchies of the binary tree division, as an example of such a division.

In addition, the block divider 11 may be configured to firstly perform the quad-tree division, and then to perform the binary tree division from an arbitrary hierarchy in order to reduce encoder processing.

FIGS. 2(a) to 2(c) illustrate an example of a method of generating flags indicating the divided shape of the case that firstly performs the quad-tree division and then performs the binary tree division. Specifically, the divided shape illustrated in FIG. 2(a) can be realized by performing the quad-tree division illustrated in FIG. 2(b) and then performing the binary tree division illustrated in FIG. 2(c).

For example, as illustrated in FIG. 2(b), in the flags indicating whether or not to perform the quad-tree division. "0" indicates that the quad-tree division is not performed for the corresponding CU, and "1" indicates that the quad-tree division is performed for the corresponding CU.

In addition, as illustrated in FIG. 2(c), for the CU for which the quad-tree division is not performed, flags indicating whether or not to further perform the binary tree division is generated. In the flags, "0" indicates that the binary tree division is not performed for the corresponding CU, "1" indicates that the binary tree division is horizontally performed for the corresponding CU, and "2" indicates that the binary tree division is vertically performed for the corresponding CU.

In addition, the flags may be configured to be transmitted together in CTU units, and may be configured to be transmitted together with the orthogonal transformation coefficients to each CU.

The prediction vector list generator (list generator) 12 is configured to generate a prediction vector list (list) including motion vector candidates of the CU to be encoded, based on a divided shape of the CU to be encoded (block to be encoded), a divided shape and a motion vector of an adjacent CU (adjacent block) adjacent to the CU to be encoded.

Specifically, the prediction vector list generator 12 is configured to generate the prediction vector list of the CU to be encoded using the divided shape of the CU to be encoded divided by the block divider 11, and the divided shape and the motion vector of the adjacent CU which are stored in the memory 17.

In HEVC, the prediction vector list generator 12 is configured to generate a prediction vector list in which five prediction vectors are stored, based on the motion vectors of adjacent CUs located on the left and upper sides of the CU to be encoded or the temporally adjacent CUs (specifically, refer to the H.265 standard). In other words, the merge mode makes it possible to reuse the motion vectors of the adjacent CUs.

Here, among the CU blocks for which the binary tree division is performed and surrounded by squares A to C in FIG. 2(c). CUs whose flags are "0" in the same division hierarchy are the same hierarchy CU (same hierarchy block). In addition, the CUs attached with flags f1/f2 in FIG. 2(c) correspond to CU1/CU2 in FIG. 2(a), the CUs attached with flags f3/f4 in FIG. 2(c) correspond to CU3/CU4 in FIG. 2(a), and the CUs attached with flags f5/f6 in FIG. 2(c) correspond to CU5/CU6 in FIG. 2(a).

As described above, in a region with uniform characteristics, the amount of information generated by the flags is reduced by performing encoding processing at the block size as large as possible. In addition, as illustrated in FIGS. 2(a)

to 2(c), as the number of division hierarchies increases, the amount of information generated by the flags indicating the divided shape increases. In other words, when two CUs generated by performing the binary tree division are not divided more than once, the features of the two CUs, such as the amount of movement, are likely to be different.

The prediction vector list generator 12 has the same width and height as the CU to be encoded, and is configured so as not to add the motion vector of the same hierarchy block, which is the CU that has existed in the same CU as the CU to be encoded before being finally divided, to the prediction vector list.

In other words, in the encoding device 1 according to the present embodiment, the prediction vector list generator 12 is configured so as not to add the motion vector of the adjacent CU to the prediction vector list, when the CU to be encoded is a CU divided by the binary tree division and the adjacent CU located on the left or upper side of the CU to be encoded is the same hierarchy CU.

Figure 3:
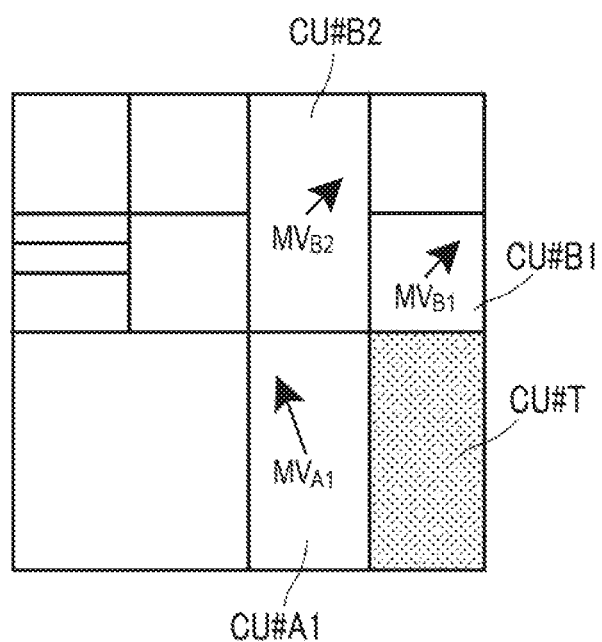
FIG. 3 is a diagram illustrating an example of a method of generating a prediction vector list by a prediction vector list generator 12 of the encoding device 1 according to the first embodiment.

For example, assuming that CU # T in FIG. 3 is the CU to be encoded, since CU # A1 adjacent to the left side is the same hierarchy CU, the prediction vector list generator 12 is configured so that a motion vector $MV_{A1}$ of CU # A1 is not added to the prediction vector list and motion vectors $MV_{B1}$ and $MV_{B2}$ of other adjacent CU # B1 and CU # B2 are added to the prediction vector list.

In addition, an example of the method of generating a prediction vector list described above is an example of applying the present disclosure based on the method of generating a prediction vector list in the HEVC, and the present disclosure is also applicable to a method of generating a prediction vector list according to a motion vector or sequence of a predetermined separate position.

The inter-predictor 13 is configured to generate a predictive image by acquiring a decoded frame from the memory 17 and acquiring a region indicated by the motion vector determined by the encoding device 1.

The orthogonal transformer and quantizer 14 is configured to obtain a quantized orthogonal transformation coefficient by performing orthogonal transformation processing and quantization processing for a difference between the predictive image generated by the inter-predictor 13 and an original image.

The entropy coder (coder) 15 is configured to perform entropy coding processing for the quantized orthogonal transformation coefficient and the motion vector of the CU to be encoded.

Here, the entropy coder 15 is configured to code the motion vector of the block to be encoded, based on the prediction vector list generated by the prediction vector list generator.

Specifically, when the merge mode is applied and the motion vector of the CU to be encoded is included in the prediction vector list generated by the prediction vector list generator 12, the entropy coder 15 is configured to encode an index in the prediction vector list.

The inverse quantizer and inverse orthogonal transformer 16 is configured to generate a residual signal by performing inverse quantization processing and inverse orthogonal transformation processing again for the quantized formation coefficient generated by the orthogonal transformer and quantizer 14.

The memory 17 is configured to hold the decoded image of the CU to be encoded usable as a reference image. Here, the decoded image is configured to be generated by adding the predictive image generated by the inter-predictor 13 to the residual signal generated by the inverse quantizer and inverse orthogonal transformer 16.

In addition, the memory 17 is configured to hold the divided shape and the motion vector of the adjacent CU adjacent to the CU to be encoded.

Figure 4:
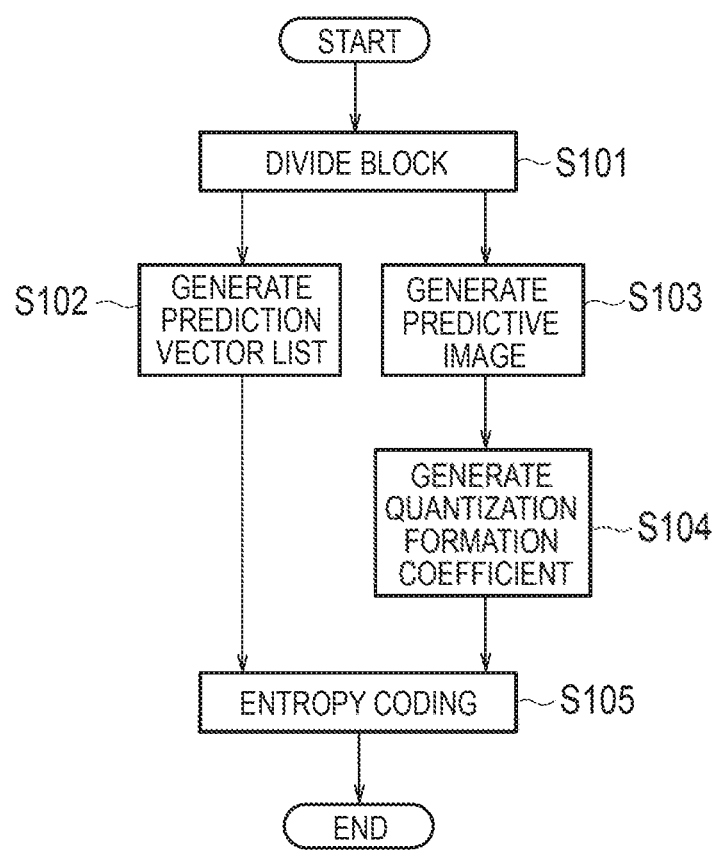
FIG. 4 is a flowchart illustrating an example of an operation of the encoding device 1 according to the first embodiment.

FIG. 4 illustrates a flowchart for explaining an example of an operation of the encoding device 1 according to the present embodiment.

As illustrated in FIG. 4, in step S101, the encoding device 1 performs the quad-tree division or the binary tree division for each CU to be encoded, and generates a flag indicating the divided shape of the block to be encoded.

In step S102, the encoding device 1 generates a prediction vector list including motion vector candidates of the CU to be encoded, based on the divided shape of the CU to be encoded, and a divided shape and a motion vector of an adjacent CU adjacent to the CU to be encoded.

In step S103, the encoding device 1 is configured to generate a predictive image of the CU to be encoded.

In step S104, the encoding device 1 generates a quantized orthogonal transformation coefficient by performing orthogonal transformation processing and quantization processing for a difference between the predictive image of the CU to be encoded and an original image.

In step S105, the encoding device 1 performs entropy coding processing for the quantized orthogonal transformation coefficient and the motion vector of the CU to be encoded.

In addition, the decoding device 3 according to the present embodiment is configured to divide and decode an original image of a frame unit constituting a moving image into CUs.

Figure 5:
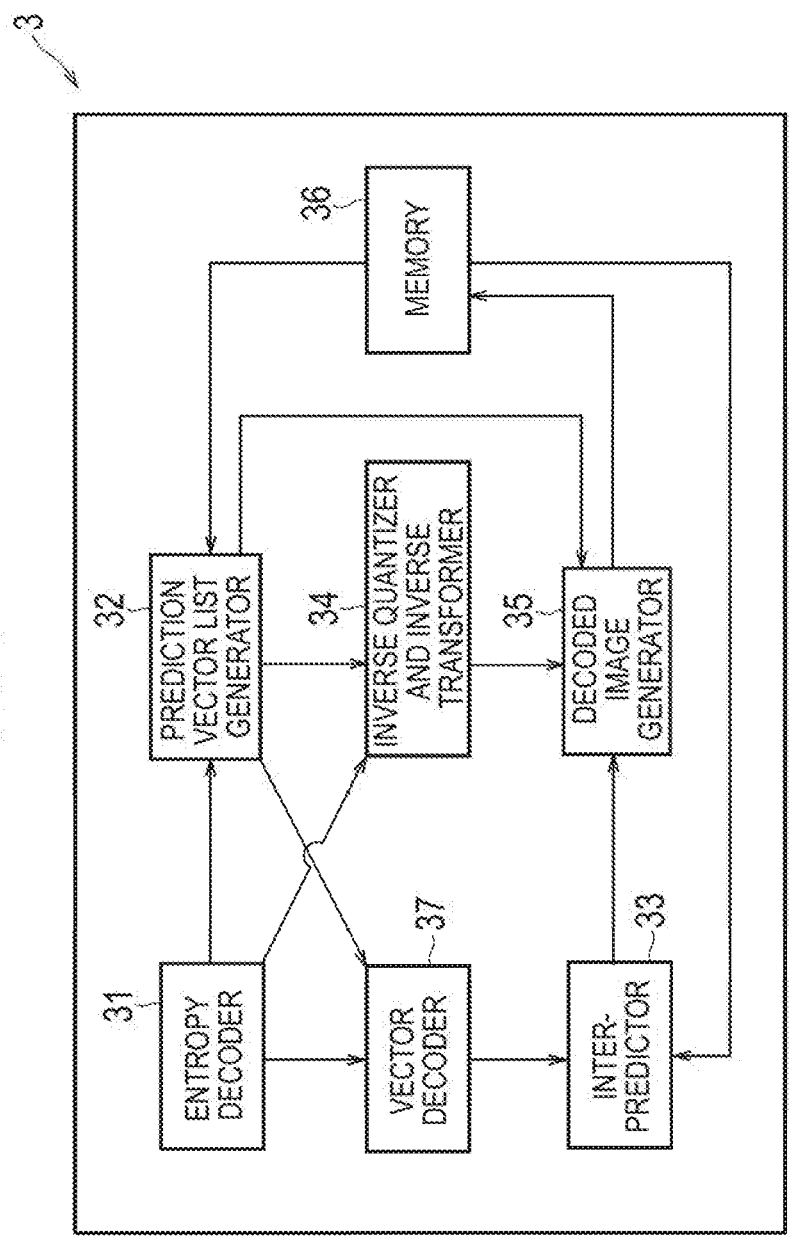
FIG. 5 is a diagram illustrating an example of functional blocks of a decoding device 3 according to the first embodiment.

As illustrated in FIG. 5, the decoding device 3 according to the present embodiment includes an entropy decoder 31, a prediction vector list generator 32, an inter-predictor 33, an inverse quantizer and inverse transformer 34, a decoded image generator 35, a memory 36, and a vector decoder 37.

The entropy decoder 31 is configured to decode the quantized orthogonal transformation coefficient and the like from the stream output from the encoding device 1 by performing entropy decoding processing for the stream output from the encoding device 1.

The prediction vector list generator 32 is configured to generate a prediction vector list of the CU to be encoded, based on a CU of the block to be encoded and a divided shape and a motion vector of an adjacent CU adjacent to the CU to be encoded, similarly to the prediction vector list generator 12 of the encoding device 1.

Here, the prediction vector list generator 32 is configured so as not to add the motion vector of the same hierarchy CU of the CU to be encoded to the prediction vector list, similarly to the prediction vector list generator 12 of the encoding device 1.

The vector decoder 37 is configured to decode the motion vector of the CU to be encoded, based on the prediction vector list generated by the prediction vector list generator 32.

The inter-predictor 33 is configured to generate a predictive image based on the motion vector of the CU to be encoded output from the vector decoder 37 and a reference image held in the memory 36.

Here, the inter-predictor 33 is configured to generate the predictive image based on the motion vector of the CU to be encoded extracted based on the prediction vector list. Specifically, when the index in the prediction vector list is included in the stream output from the encoding device 1 as information indicating the motion vector of the CU to be encoded, the inter-predictor 33 is configured to generate the predictive image using a motion vector corresponding to the index in the prediction vector list.

The inverse quantizer and inverse transformer 34 is configured to generate a residual signal by performing inverse quantization processing and inverse transformation processing (e.g., inverse orthogonal transformation processing) for the quantized transformation coefficient output by the entropy decoder 31.

The decoded image generator 35 is configured to generate a decoded image by adding the predictive image generated by the inter-predictor 33 and the residual signal generated by the inverse quantizer and inverse orthogonal transformer 34.

The memory 36 is configured to hold the decoded image generated by the decoded image generator 35 usable as a reference image for inter-prediction.

Figure 6:
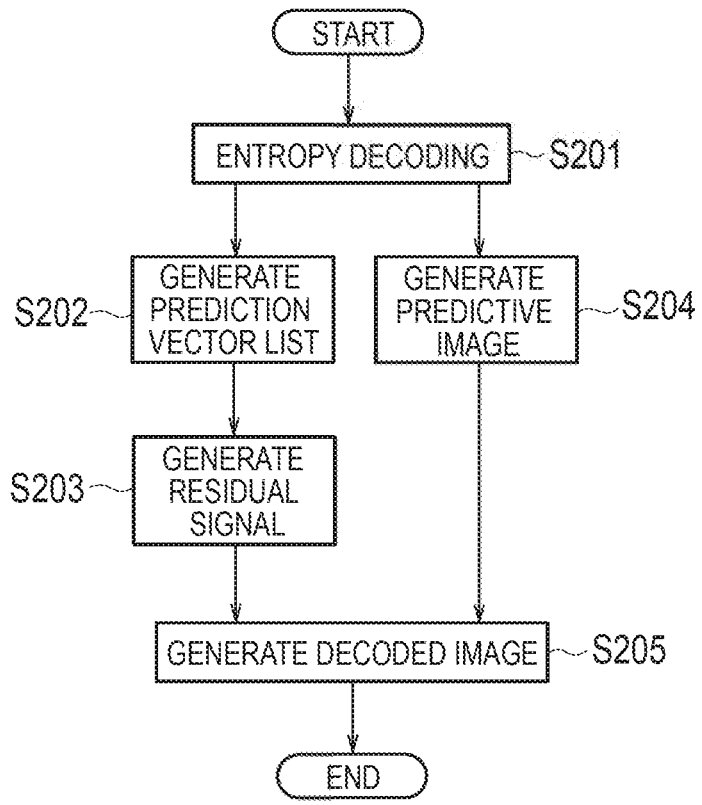
FIG. 6 is a flowchart illustrating an example of an operation of the decoding device 3 according to the first embodiment.

FIG. 6 illustrates a flowchart for explaining an example of an operation of the decoding device 3 according to the present embodiment.

As illustrated in FIG. 6, in step S201, the decoding device 3 decodes the quantized orthogonal transformation coefficient and the like from the stream output from the encoding device 1 by performing entropy decoding processing for the stream output from the encoding device 1.

In step S202, the decoding device 3 generates a prediction vector list of the CU to be encoded, based on a CU of the block to be encoded, and a divided shape and a motion vector of an adjacent CU adjacent to the CU to be encoded.

In step S203, the decoding device 3 decodes the motion vector of the CU to be encoded based on the prediction vector list, and generates the predictive image based on the motion vector of the CU to be encoded and the held reference image.

In step S204, the decoding device 3 generates a residual signal by performing inverse quantization processing and inverse transformation processing (e.g., inverse orthogonal transformation processing) for the quantized transformation coefficient.

In step S205, the decoding device 3 generates the decoded image by adding the predictive image and the residual signal to each other.

The encoding device 1 and the decoding device 3 according to the present embodiment can improve prediction efficiency of the motion vector to improve encoding efficiency by generating the prediction vector list according to the divided shape of the CU to be encoded.

Second Embodiment

Hereinafter, an encoding device 1 and a decoding device 3 according to a second embodiment of the present disclosure will be described with reference to FIG. 7 based on differences from the encoding device 1 and the decoding device 3 according to the first embodiment described above In the encoding device 1 according to the present embodiment, even though a motion vector of an adjacent CU that is not the same hierarchy CU of the CU to be encoded is the same as the motion vector that is determined not to be added to the prediction vector list of the CU to be encoded, the prediction vector list generator 12 is configured so as not to add the motion vector of the adjacent CU that is not the same hierarchy CU to the prediction vector list of the CU to be encoded.

Figure 7:
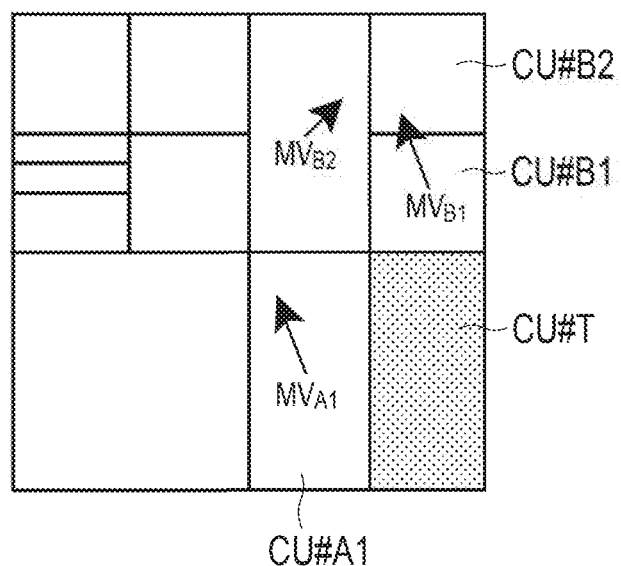
FIG. 7 is a diagram illustrating an example of a method of generating a prediction vector list by a prediction vector list generator 12 of an encoding device 1 according to a second embodiment.

That is, in the encoding device 1 according to the first embodiment, the prediction vector list generator 12 is configured so as not to add the motion vector of the same hierarchy CU of the CU to be encoded to the prediction vector list, but as illustrated in FIG. 7, when the motion vector of the adjacent CU, which is not the same hierarchy CU of the CU to be encoded and the motion vector of the same hierarchy CU of the CU to be encoded are the same as each other, the prediction vector list generator 12 is configured to add the motion vectors to the prediction vector list.

In contrast, in the encoding device 1 according to the present embodiment, the prediction vector list generator 12 is configured to store the motion vector of the same hierarchy CU of the CU to be encoded as a prediction vector list addition prohibition vector, and is configured so as not to add the motion vector to the prediction vector list, when the motion vector of the adjacent CU that is not the same hierarchy CU of another CU to be encoded is the same as the prediction vector list addition prohibition vector.

For example, in an example of FIG. 7, the prediction vector list generator 12 is configured to store a motion vector $MV_{A1}$ of CU # A, which is the same hierarchy CU of CU # T, which is the CU to be encoded, as the prediction vector list addition prohibition vector.

In addition, the prediction vector list generator 12 is configured so as not to add a motion vector $MV_{B1}$ to the prediction vector list because the motion vector $MVB_1$ of CU # B1 that is not the same hierarchy CU of the CU to be encoded located on an upper side of the CU to be encoded (CU # T) is the same as the prediction vector list addition prohibition vector (motion vector MVA1).

On the other hand, the prediction vector list generator 12 is configured to add a motion vector $MV_{B2}$ to the prediction vector list because the motion vector $MVB_2$ of CU # B2 that is not the same hierarchy CU of the CU to be encoded located on the upper side of the CU to be encoded (CU # T) is not the same as the prediction vector list addition prohibition vector (motion vector MVA1).

In addition, in the decoding device 3 according to the present embodiment, even though a motion vector of an adjacent CU that is not the same hierarchy CU of the CU to be encoded is the same as the motion vector that is determined not to be added to the prediction vector list of the CU to be encoded, the prediction vector list generator 32 is configured so as not to add the motion vector of the adjacent CU that is not the same hierarchy CU to the prediction vector list of the CU to be encoded, similarly to the prediction vector list generator 12.

Third Embodiment

Hereinafter, an encoding device 1 and a decoding device 3 according to a third embodiment of the present disclosure will be described with reference to FIGS. 8 and 9 based on differences from the encoding device 1 and the decoding device 3 according to the first embodiment described above.

Figure 8:
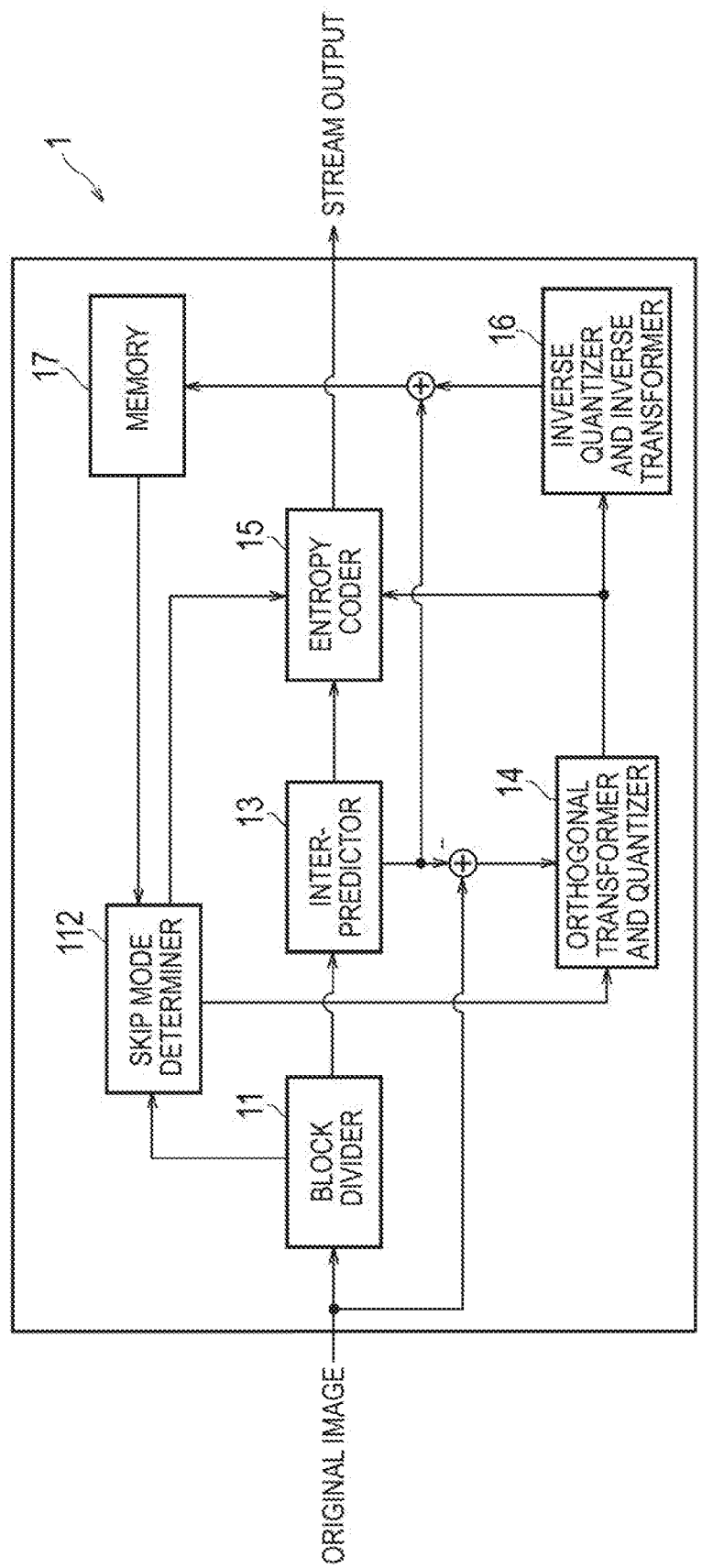
FIG. 8 is a diagram illustrating an example of functional blocks of an encoding device 1 according to a third embodiment.
Figure 9:
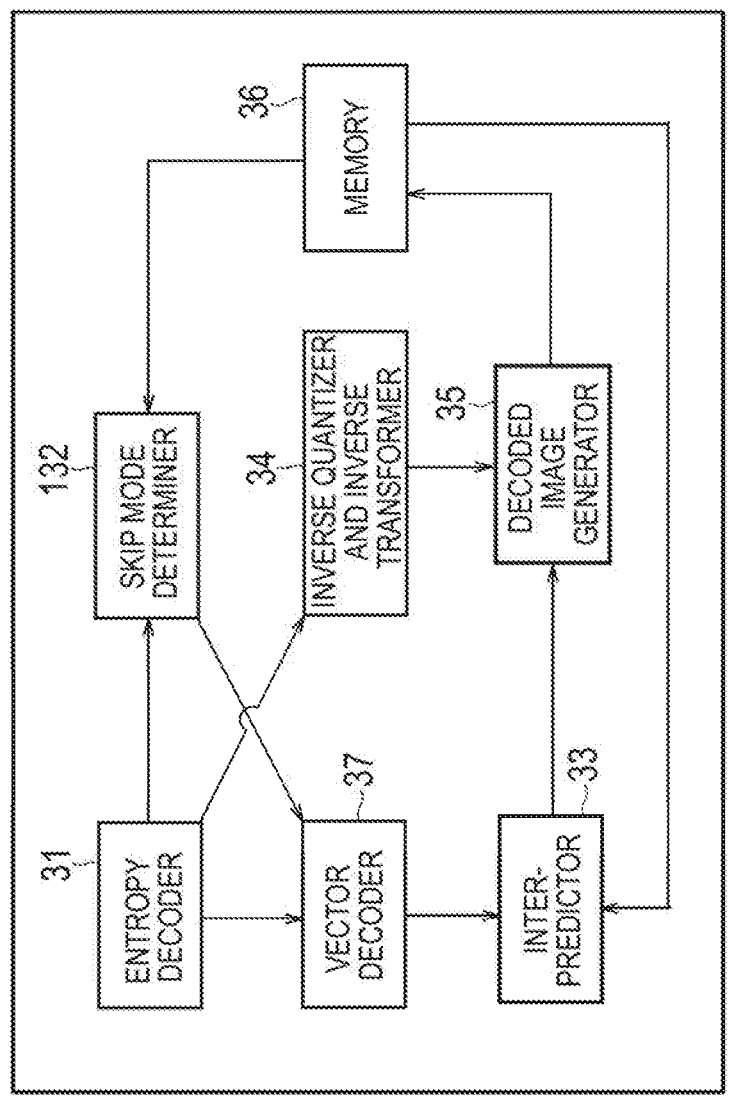
FIG. 9 is a diagram illustrating an example of functional blocks of a decoding device 3 according to the third embodiment.

As illustrated in FIG. 8, the encoding device 1 according to the present embodiment includes a skip mode determiner 112 instead of the prediction vector list generator 12. Similarly, as illustrated in FIG. 9, the decoding device 3 according to the present embodiment includes a skip mode determiner 132 instead of the prediction vector list generator 2.

The skip mode determiner (determiner) 112 is configured to determine whether or not to the residual signal is transmitted in the CU to be encoded, based on the divided shape and the motion vector of the CU to be encoded, the divided shape and the motion vector of the adjacent CU adjacent to the CU to be encoded, and the flag indicating whether or not to the residual signal is transmitted in the CU to be encoded (i.e., whether or not the skip mode is applied).

That is, the skip mode determiner 112 is configured to determine whether or not the skip mode is applied in the CU to be encoded, based on the divided shape and the motion vector of the CU to be encoded, the divided shape and the motion vector of the adjacent CU adjacent to the CU to be encoded, and the flag indicating whether or not the residual signal is transmitted.

Specifically, when the residual signal is not transmitted in the same hierarchy CU of the CU to be coded (i.e., when the skip mode is applied), and the motion vector of the CU to be coded and the motion vector of the same hierarchy CU are the same as each other, the skip mode determiner 112 is configured to determine that the residual signal is transmitted in the CU to be encoded (i.e., the skip mode is not applied).

Here, the skip mode is a mode that transmits only the flag indicating whether or not the skip mode is applied by setting the residual signal to 0 so as not to transmit the residual signal, and the index indicating which number of the prediction vector list is applied.

As illustrated in FIG. 19(b), when the left and right CUs divided by the binary tree division have the same motion vector information, the amount of transmission information to transmit the motion vector of each CU increases as described above.

However, when a very low residual signal exists for one CU of the left and right CUs, and the residual signal occurs in the other CU, it is highly likely that the information amount of the orthogonal transformation coefficient can be reduced by applying the skip mode to one CU so as not to transmit the residual signal as 0, and transmitting the residual signal for the other CU (i.e., not applying the skip mode).

On the other hand, when energy of the residual signal is extremely small in the entire CU, as illustrated in FIG. 19(a), the CU in which the binary tree division is not performed can reduce the amount of information necessary for the transmission of the motion vector.

That is, as illustrated in FIG. 19(a), in the CU in which the binary tree division is performed, when the motion vector applied to the CU to be encoded is the same as the motion vector applied to the same hierarchy CU of a reference destination and the skip mode is applied to the same hierarchy CU of the reference destination, it is unlikely that the skip mode is applied to the CU to be encoded.

Therefore, in the encoding device 1 according to the present embodiment, when the same hierarchy CU referred to for generation of the prediction vector list of the CU to be encoded does not transmit the residual signal, and the motion vector of the CU to be encoded is the same as the motion vector of the same hierarchy CU, the skip mode determiner 112 is configured to prohibit the application of the skip mode in the CU to be encoded (transmission of the residual signal in the CU to be encoded).

In addition, the orthogonal transformer and quantizer 14 is configured so as not to perform orthogonal transformation processing and quantization processing for the residual signal with respect to the CU to be encoded, when the skip mode is applied.

In addition, the entropy coder 15 is configured to code the flag indicating that the motion vector of the CU to be encoded and the skip mode are applied without coding the quantized orthogonal transformation coefficient for the CU to be encoded, when the skip mode is applied.

In addition, when the skip mode for the CU to be encoded is prohibited in the skip mode determiner 12, the entropy coder 15 is configured so as not to code the flag indicating whether or not the skip mode is applied (whether or not a residual signal is transmitted in the CU to be encoded).

In addition, in the decoding device according to the present embodiment, similarly to the skip mode determiner 112, the skip mode determiner 132 is configured to determine whether or not the residual signal is transmitted in the CU to be encoded, based on the divided shape and the motion vector of the CU to be encoded, and the divided shape and the motion vector of the adjacent CU adjacent to the CU to be encoded.

That is, the skip mode determiner 132 is configured to determine whether or not the skip mode is applied in the CU to be encoded, based on the divided shape and the motion vector of the CU to be encoded, and the divided shape and the motion vector of the adjacent CU adjacent to the CU to be encoded.

Specifically, similar to the skip mode determiner 112, when the residual signal is not transmitted in the same hierarchy CU of the CU to be coded (i.e., when the skip mode is applied), and the motion vector of the CU to be coded and the motion vector of the same hierarchy CU are the same as each other, the skip mode determiner 132 is configured to determine that the residual signal is transmitted in the CU to be encoded (i.e., the skip mode is not applied).

In addition, when the skip mode for the CU to be encoded is prohibited in the skip mode determiner 132, the entropy decoder 31 is configured so as not to decode the flag (information) indicating whether or not the skip mode is applied (whether or not the residual signal is transmitted in the CU to be encoded), similarly to the entropy coder 15.

In addition, the inverse quantizer and inverse transformer 34 is configured so as not to perform inverse quantization processing and inverse transformation processing (e.g., inverse orthogonal transformation processing) for the quantized orthogonal transformation coefficient with respect to the CU to be encoded, when the skip mode is applied.

In addition, the decoded image generator 35 is configured to generate the decoded image using the predictive image generated by the inter-predictor 33 without using the residual signal, when the skip mode is applied.

In the encoding device 1 and the decoding device 3 according to the present embodiment, the transmission information amount of flags according to the skip mode can be reduced to improve the encoding efficiency.

Fourth Embodiment

Hereinafter, an encoding device 1 and a decoding device 3 according to a fourth embodiment of the present disclosure will be described based on differences from the encoding device 1 and the decoding device 3 according to the first embodiment described above.

In the encoding device 1 according to the present embodiment, when the residual signal is not transmitted in the same hierarchy CU of the CU to be encoded (when the skip mode is applied) and the residual signal is also not transmitted in the CU to be encoded (when the skip mode is applied), the prediction vector list generator 12 is configured so as not to add the motion vector of the same hierarchy CU to the prediction vector list.

In the encoding device 1 according to the first embodiment, the prediction vector list generator 12 is configured so as not to add the motion vector of the same hierarchy CU of the CU to be encoded to the prediction vector list.

On the other hand, in the encoding device 1 according to the present embodiment, the prediction vector list generator 12 is configured so as not to add the motion vector of the same hierarchy CU of the CU to be encoded to the prediction vector list, only when the skip mode is applied to both the same hierarchy CU of the reference destination and the CU to be encoded.

Here, when the skip mode is applied in the same hierarchy CU of the reference destination and the skip mode is also applied in the CU to be encoded, it is unlikely that the motion vector of the same hierarchy CU of the reference destination is applied to the CU to be encoded. Therefore, the prediction vector list generator 12 of the encoding device 1 according to the present embodiment functions as described above.

In addition, in the decoding device 3 according to the present embodiment, when the residual signal is not transmitted in the same hierarchy CU of the CU to be encoded (when the skip mode is applied) and the residual signal is also not transmitted in the CU to be encoded (when the skip mode is applied), the prediction vector list generator 32 is configured so as not to add the motion vector of the same hierarchy CU to the prediction vector list, similarly to the prediction vector list generator 12.

Fifth Embodiment

Figure 10:
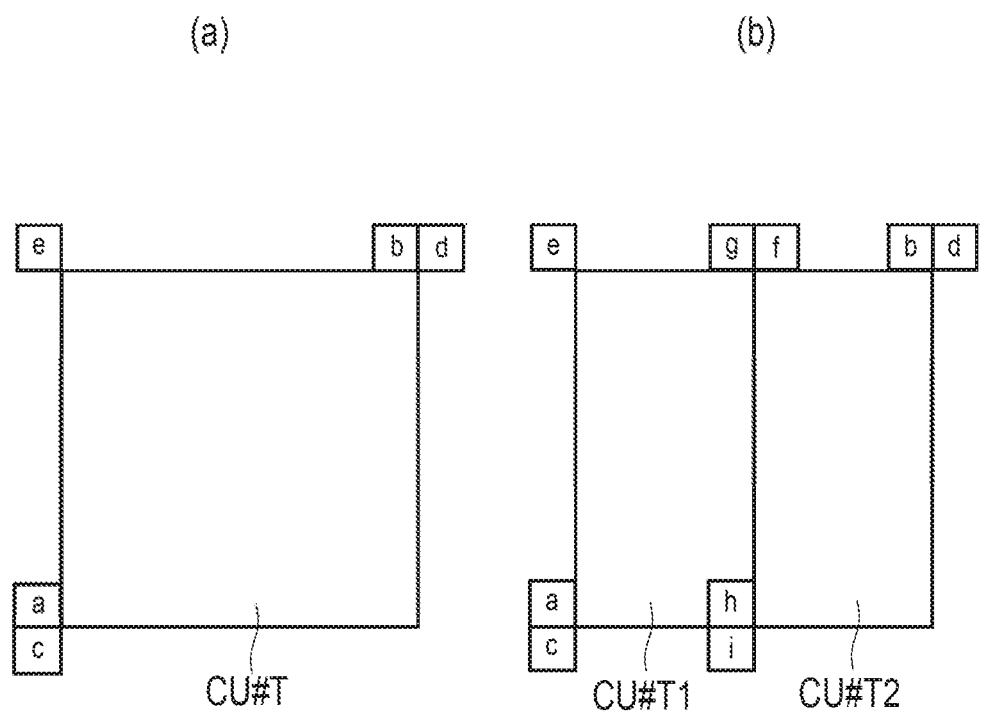
FIG. 10 is a diagram illustrating an example of a method of generating a prediction vector list by a prediction vector list generator 12 of an encoding device 1 according to a fifth embodiment.

Hereinafter, an encoding device 1 and a decoding device 3 according to a fifth embodiment of the present disclosure will be described with reference to FIG. 10 based on differences from the encoding device 1 and the decoding device 3 according to the first embodiment described above.

In the encoding device 1 according to the present embodiment, when a width of the adjacent CU located on the upper side or the left side of the CU to be encoded is larger than twice the width of the CU to be encoded, the prediction vector list generator 12 is configured so as not to add the motion vector of the same hierarchy CU of the CU to be encoded to the prediction vector list.

For example, in a case illustrated in FIG. 10(a), the prediction vector list generator 12 is configured to add motion vectors at positions of a/b/c/d/e as motion vector candidates to a prediction vector list of CU # T to be encoded.

On the other hand, in a case illustrated in FIG. 10(b), the prediction vector list generator 12 is configured to add motion vectors at positions of a/g/c/f/e as motion vector candidates to a prediction vector list of CU # T1 to be encoded, and to add motion vectors at positions of h/b/i/d/g as motion vector candidates to a prediction vector list of CU # T2 to be encoded.

In this case, if a true motion vector of CU # T (CU # T1 and CT # T2) is a motion vector at the position of g, there is a possibility that an inter-prediction system is improved by selecting an index indicating the motion vector at the position of h in CU # T1 that selects an index indicating the motion vector at the position of g in the prediction vector list as the motion vector of CU # T1 and selects an index indicating the motion vector at the position of g in the prediction vector list as the motion vector CU # T2.

That is, in this case, the prediction vector list generator 12 may preferably be configured to add the motion vector of the same hierarchy CU # T1 (the motion vector at the position of h) of CU # T2 to be encoded to the prediction vector list.

However, such a possibility is limited to a case in which when the CU is divided vertically, the motion vectors at the positions of g/f located on the upper sides of CU # T1/CU # T2 are different front the motion vector at the position of b.

Therefore, when the CU is divided vertically, in a case in which a width of the adjacent CU located on the upper side of the CU # T2 to be encoded is larger than twice the width of the CU # T2 to be encoded, that is, the motion vectors at the positions of g/f located on the upper side of CU # T1/CU # T2 are the same as the motion vector at the position of b, the prediction vector list generator 12 is configured so as not to add the motion vector of the same hierarchy CU # T1 of the CU to be encoded to the prediction vector list.

Similarly, when the CU is divided in horizontally, in a case in which a height of an adjacent CU located on the left side of the CU to be encoded is larger than twice the height of the CU to be encoded, the prediction vector list generator 12 is configured so as not to add the motion vector of the same hierarchy CU of the CU to be encoded to the prediction vector list.

In addition, when the motion vectors of a plurality of adjacent CUs located on the left side or the upper side of the CU to be encoded and the same hierarchy CU are the same as each other, the prediction vector list generator 12 is configured so as not to add the motion vector of the same hierarchy CU to the prediction vector list.

For example, as illustrated in FIG. 10(b), even in a case in which the width of the adjacent CU located on the upper side or the left side of the CU to be encoded is not larger than twice the width of CU to be encoded, when the motion vectors of the plurality of adjacent CUs located on the upper side of CU # T2 to be encoded and the same hierarchy CU # T1 (i.e., the motion vectors located at g/f/b) are the same as each other, the prediction vector list generator 12 may be configured so as not to add the motion vector of the same hierarchy CU #1 to the prediction vector list.

Similarly, in the decoding device 3 according to the present embodiment, when the width of the adjacent CU located on the upper side or the left side of the CU to be encoded is larger than twice the width of the CU to be encoded, the prediction vector list generator 32 is configured so as not to add the motion vector of the same hierarchy CU of the CU to be encoded to the prediction vector list, similarly to the prediction vector list generator 12.

In addition, in the decoding device 3 according to the present embodiment, when the motion vectors of a plurality of adjacent CUs located on the upper side or the left side of the CUs to be encoded and the same hierarchy CU are the same as each other, the prediction vector list generator 32 may be configured so as not to add the motion vector of the same hierarchy CU to the prediction vector list, similarly to the prediction vector list generator 12.

Modified Example 1

Hereinafter, an encoding device 1 and a decoding device 3 according to Modified Example 1 of the present disclosure will be described with reference to FIG. 11 based on differences from the encoding device 1 and the decoding device 3 according to the first embodiment described above.

Figure 11:
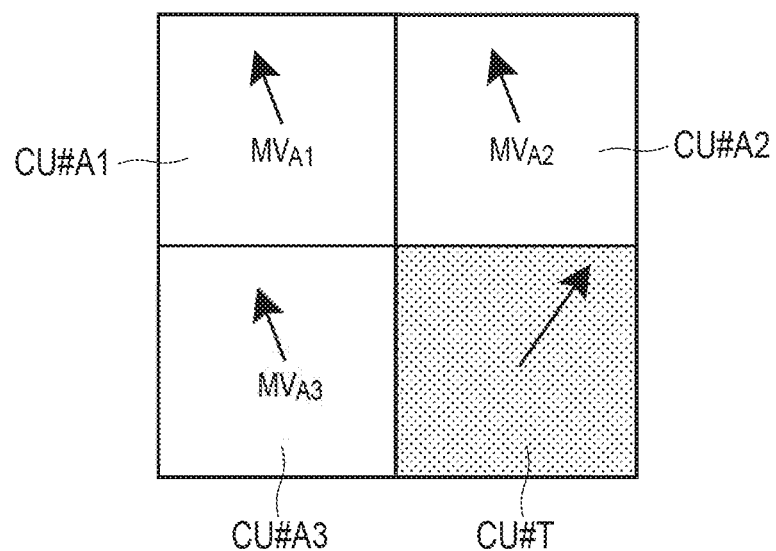
FIG. 11 is a diagram for explaining a first modified example.

In the example illustrated in FIG. 11, it is assumed that CU # T1/CU # A1/CU # A2/CU # A3 are obtained by the quad-tree division. In this example, since CU # A1/CU # A2/CU # A3 have the same width and height as CU # T to be encoded and are present in the same CU before being finally divided, CU # A1/CU # A2/CU # A3 are the same hierarchy CUs of CU # T to be encoded.

In addition, in this example, since a motion vector $MV_{A1}$ of CU # A1, a motion vector $MV_{A2}$ of CU # A2, and a motion vector $MV_{A3}$ of CU # A3 are the same as each other, a possibility of taking the same motion vector as the motion vector $MV_{A1}$ of CU # A1, the motion vector $MV_{A2}$ of CU # A2, and the motion vector $MV_{A3}$ of CU # A3 in the CU # T to be encoded is low.

Therefore, even in the case in which the quad-tree division is performed, the prediction vector list generator 12 and the prediction vector list generator 32 are configured so as not to add such a motion vector to the prediction vector list of the CU to be encoded when all of the same hierarchy CUs are the same motion vector.

Modified Example 2

Figure 12:
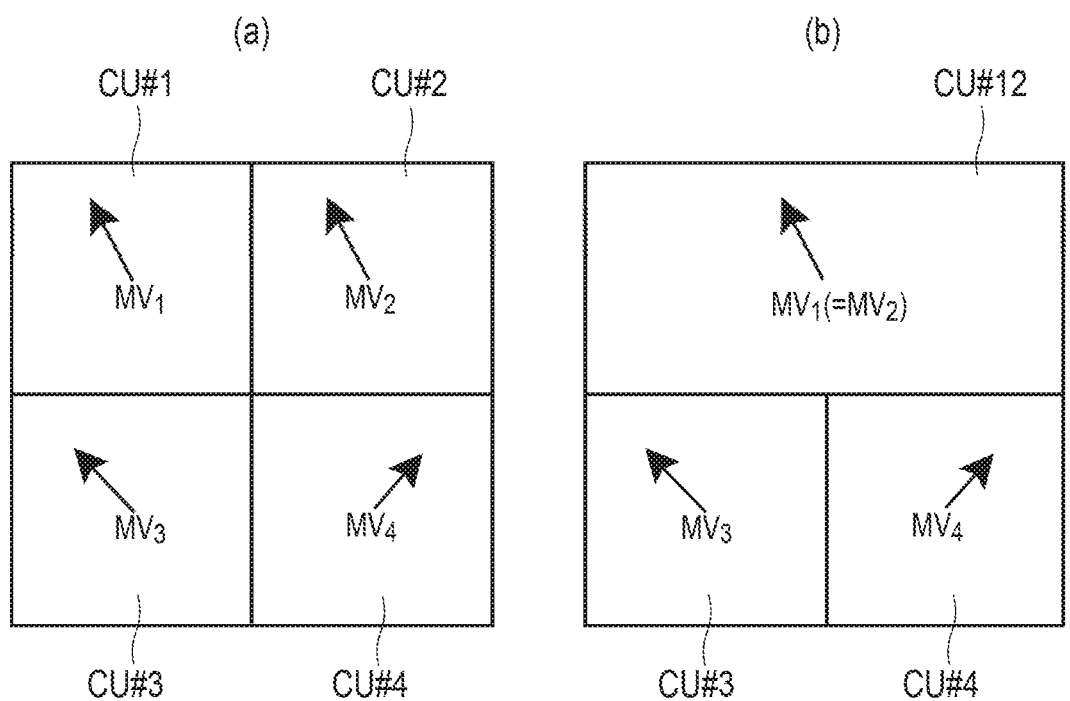
FIG. 12 is a diagram for explaining a second modified example.
Figure 13:
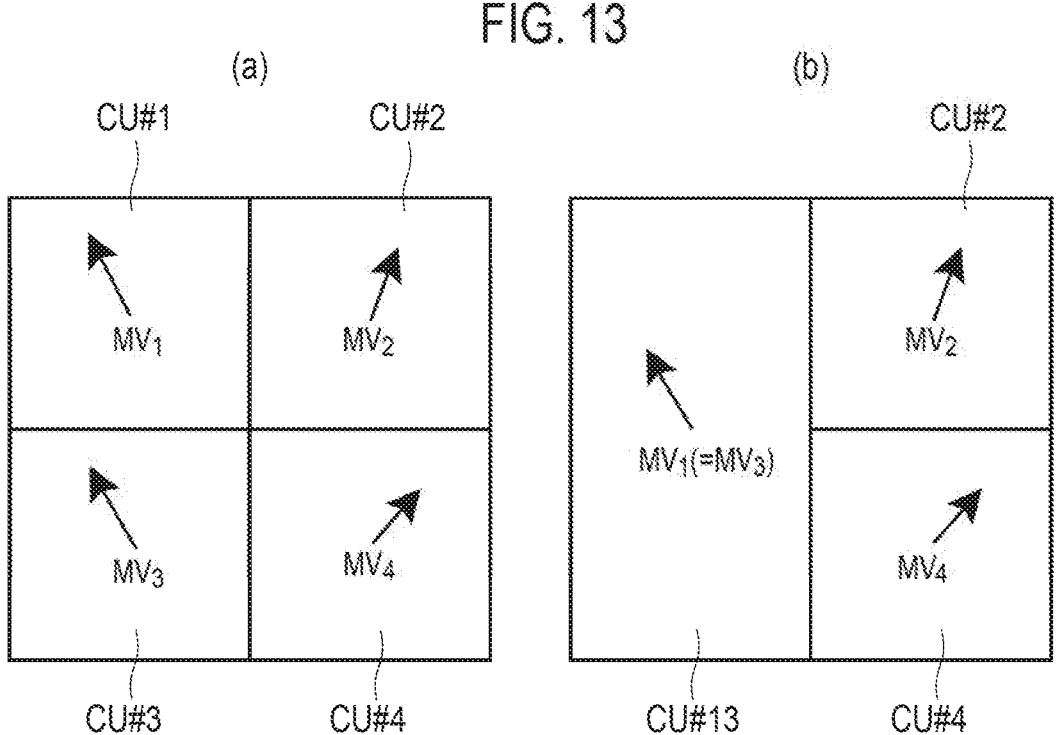
FIG. 13 is a diagram for explaining the second modified example.

Hereinafter, an encoding device 1 and a decoding device 3 according to Modified Example 2 of the present disclosure will be described with reference to FIGS. 12 and 13 based on differences from the encoding device 1 and the decoding device 3 according to the first embodiment described above.

As illustrated in FIGS. 12(a) and 13(a), in the present modified example, it is assumed that CU #1/CU #2/CU #3/CU #4 are obtained by the quad-tree division. Here, it is assumed that a motion vector of CU #1 is $MV_1$, a motion vector of CU #2 is $MV_2$, a motion vector of CU #3 is $MV_3$, and a motion vector of CU #4 is $MV_4$.

In the present modified example, as illustrated in FIGS. 12(b) and 13(b), it is configured to be able to apply the binary tree division in addition to the quad-tree division. That is, in the present modified example, as illustrated in FIG. 12(b), it is possible to integrate CU #1 and CU #2, or as illustrated in FIG. 13(b), it is possible to integrate CU #1 and CU #3.

Here, CU #2 and CU #3 are the same hierarchy blocks adjacent to CU #1 (i.e., the same hierarchy adjacent blocks of CU #1), CU #1 and CU #4 are the same hierarchy blocks adjacent to CU #2 (i.e., the same hierarchy adjacent blocks of CU #2), CU #1 and CU #4 are the same hierarchy blocks adjacent to CU #3 (i.e., the same hierarchy adjacent blocks of CU #3), and CU #2 and CU #3 are the same hierarchy blocks adjacent to CU #4 (i.e., the same hierarchy adjacent blocks of CU #4).

On the other hand, CU #4 is the same hierarchy block which is not adjacent to CU #1 (i.e., the same hierarchy non-adjacent block of CU #1), CU #3 is the same hierarchy block which is not adjacent to CU #2 (i.e., the same hierarchy non-adjacent blocks of CU #2), CU #2 is the same hierarchy block which is not adjacent to CU #3 (i.e., the same hierarchy non-adjacent block of CU #3), and CU #1 is the same hierarchy block which is not adjacent to CU #4 (i.e., the same hierarchy non-adjacent blocks of CU #4).

In Modified Example 2, as illustrated in FIG. 12(a), when the motion vector $MV_1$ of CU #1 and the motion vector $MV_2$ of CU #2 are the same as each other, CU #1 and CU #2 are configured to be integrated as illustrated in FIG. 12(b).

Therefore, in a case in which the block to be encoded is set to CU #2, since CU #2 and CU #1 which is the same hierarchy block adjacent to CU #2 (i.e., the same hierarchy adjacent block of CU #2), are not integrated although CU #2 and CU #1 are able to be integrated, it is considered that the motion vector $MV_1$ of CU #1 and the motion vector $MV_2$ of CU #2 are not the same as each other. For this reason, the prediction vector list generator 12 and the prediction vector list generator 32 are configured so as not to add the motion vector $MV_1$ of CU #1 to a prediction vector list of CU #2.

Similarly, as illustrated in FIG. 13(a), when the motion vector $MV_1$ of CU #1 and the motion vector $MV_3$ of CU #3 are the same as each other, CU #1 and CU #3 are configured to be integrated as illustrated in FIG. 13(b).

Therefore, in a case in which the block to be encoded is set to CU #3, since CU #3 and CU #1, which is the same hierarchy block adjacent to CU #3 (i.e., the same hierarchy adjacent block of CU #3), are not integrated although CU #3 and CU #1 are able to be integrated, it is considered that the motion vector $MV_1$ of CU #1 and the motion vector $MV_3$ of CU #3 are not the same as each other. For this reason, the prediction vector list generator 12 and the prediction vector list generator 32 are configured so as not to add the motion vector $MV_1$ of CU #1 to a prediction vector list of CU #3.

Modified Example 3

Figure 14:
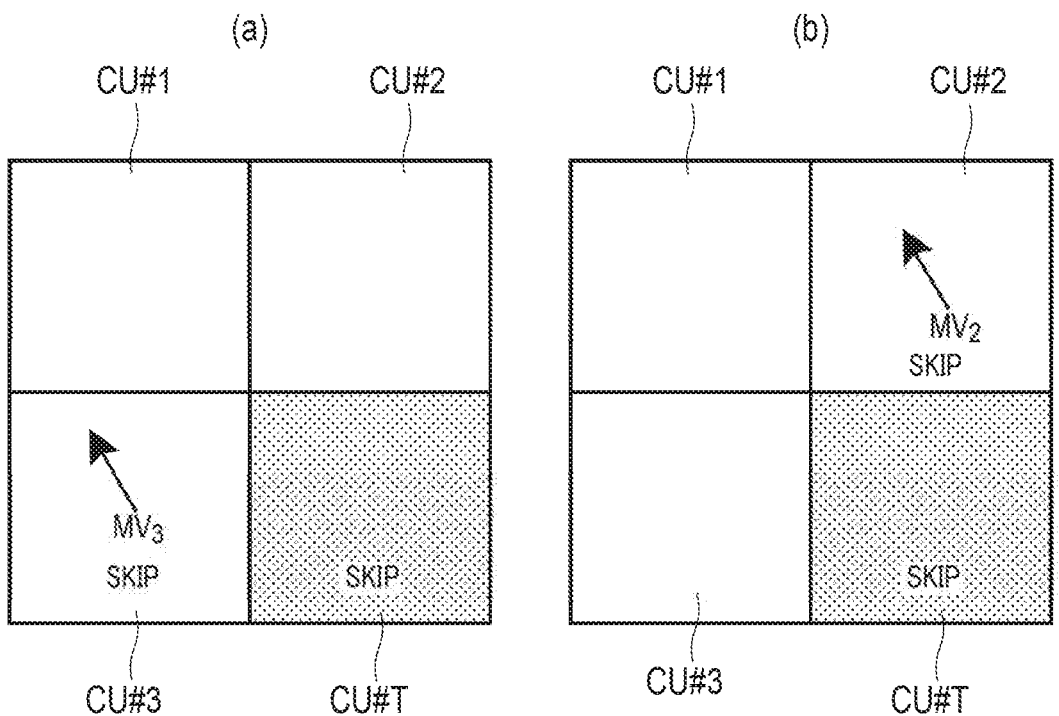
FIG. 14 is a diagram for explaining a third modified example.

Hereinafter, an encoding device 1 and a decoding device 3 according to Modified Example 3 of the present disclosure will be described with reference to FIG. 14 based on differences from the encoding device 1 and the decoding device 3 according to the first embodiment described above.

In the present modified example, when the residual signal is not transmitted CU # T, which is the block to be encoded (i.e., when the skip mode is applied), the residual signal is not transmitted in CU #3, which is the same hierarchy adjacent block of CU # T (i.e., the skip mode is applied), and CU # T and CU #3 are able to be integrated, CU # T and CU #3 are configured to be integrated.

Therefore, as illustrated in FIG. 14(a), when the residual signal is not transmitted in CU # T, which is the block to be encoded (i.e., when the skip mode is applied), the residual signal is not transmitted in CU #3, which is the same hierarchy adjacent block of CU # T (i.e., the skip mode is applied), and CU # T and CU #3 are not integrated although CU # T and CU #3 are able to be integrated, the prediction vector list generator 12 and the prediction vector list generator 32 consider that the motion vector of CU # T and the motion vector $MV_3$ of the CU #3 are not the same as each other. For this reason, in this case, the prediction vector list generator 12 and the prediction vector list generator 32 are configured so as not to add the motion vector $MV_3$ of CU #3 to a prediction vector list of CU # T.

Similarly, when the residual signal is not transmitted in CU # T, which is the block to be encoded (i.e., when the skip mode is applied), the residual signal is not transmitted in CU #2, which is the same hierarchy adjacent block of CU # T (i.e., the skip mode is applied), and CU # T and CU #2 are able to be integrated, CU # T and CU #2 are configured to be integrated.

Therefore, as illustrated in FIG. 14(b), when the residual signal is not transmitted in CU # T, which is the block to be encoded (i.e., when the skip mode is applied), the residual signal is not transmitted in CU #2, which is the same hierarchy adjacent block of CU # T (i.e., the skip mode is applied), and CU # T and CU #2 are not integrated although CU # T and CU #2 are able to be integrated, the prediction vector list generator 12 and the prediction vector list generator 32 consider that the motion vector of CU # T and the motion vector $MV_2$ of the CU #2 are not the same as each other. For this reason, in this case, the prediction vector list generator 12 and the prediction vector list generator 32 are configured so as not to add the motion vector $MV_2$ of CU #2 to the prediction vector list of CU # T.

Modified Example 4

Figure 15:
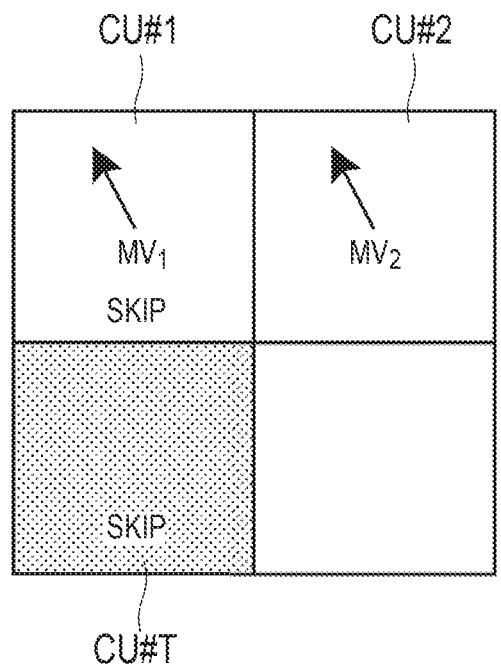
FIG. 15 is a diagram for explaining a fourth modified example.

Hereinafter, an encoding device 1 and a decoding device 3 according to Modified Example 4 of the present disclosure will be described with reference to FIG. 15 based on differences from the encoding device 1 and the decoding device 3 according to the first embodiment described above.

In the present modified example, when the residual signal is not transmitted in CU # T, which is the block to be encoded (i.e., when the skip mode is applied), the residual signal is not transmitted in CU #1, which is the same hierarchy adjacent block of CU # T (i.e., the skip mode is applied), the residual signal is transmitted in CU #2, which is the same hierarchy non-adjacent block of CU # T (i.e., the skip mode is not applied), CU # T and CU #2 are able to be integrated, and the motion vector $MV_1$ of CU #1 and the motion vector $MV_2$ of the CU #2 are the same as each other, the prediction vector list generator 12 and the prediction vector list generator 32 are configured so as not to add the motion vector $MV_2$ of CU #2 to the prediction vector list of CU # T.

Modified Example 5

Hereinafter, an encoding device 1 and a decoding device 3 according to Modified Example 5 of the present disclosure will be described with reference to FIG. 16 based on differences from the encoding device 1 and the decoding device 3 according to the third embodiment described above.

Figure 16:
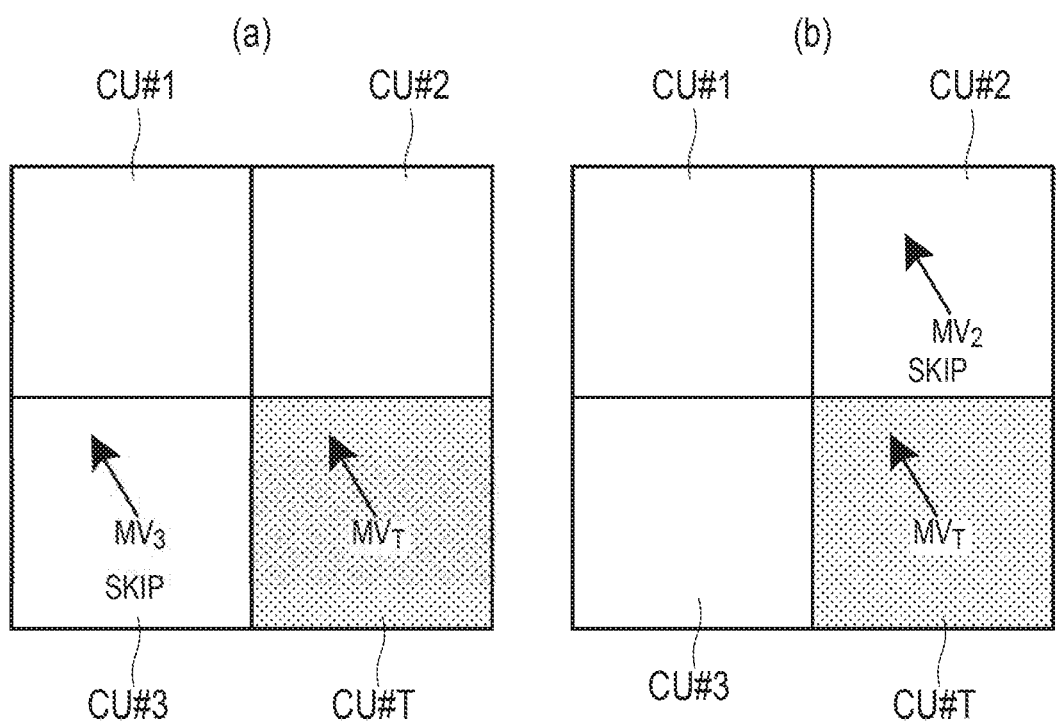
FIG. 16 is a diagram for explaining a fifth modified example.
Figure 17:
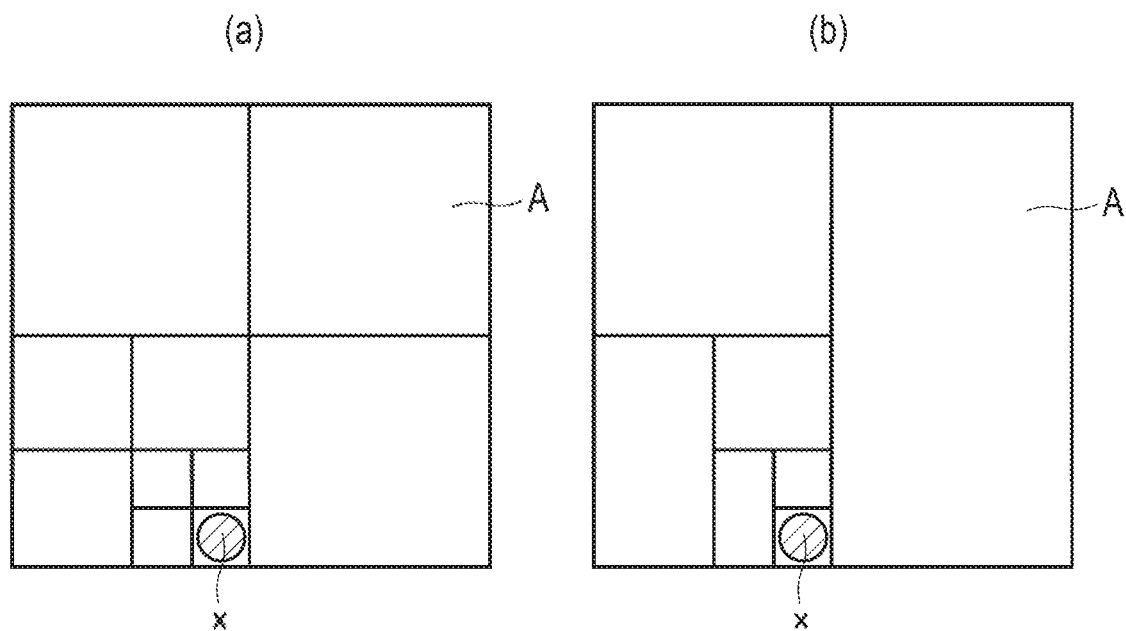
FIG. 17 is a diagram for explaining the conventional technology.

As illustrated in FIGS. 16(*a*) and 16(*b*), in the present modified example, it is assumed that CU #1/CU #2/CU #3/CU # T are obtained by the quad-tree division.

In the present modified example, as illustrated in FIG. 16(*a*), when CU # T, which is the block to be encoded and CU #3, which is the same hierarchy adjacent block of CU # T are able to be integrated, the residual signal is not transmitted in CU #3 (i.e., the skip mode is not applied), and the motion vector of CU # T and the motion vector $MV_3$ of CU #3 are the same as each other, the skip mode determiner 112 and the skip mode determiner 132 are configured to determine that the residual signal is transmitted in CU # T (i.e., the skip mode is not applied.

Similarly, as illustrated in FIG. 16(*b*), when CU # T, which is the block to be encoded and CU #2, which is the same hierarchy adjacent block of CU # T, are able to be integrated, the residual signal is not transmitted in CU #2 (i.e., the skip mode is not applied), and the motion vector of CU # T and the motion vector $MV_2$ of CU #2 are the same as each other, the skip mode determiner 112 and the skip mode determiner 132 are configured to determine that the residual signal is transmitted in CU # T (i.e., the skip mode is not applied.

Other Embodiments

As described above, the present disclosure has been described with reference to the embodiments described above, but it should not be understood that the description and the drawings that form a part of the disclosure in the embodiment limit the present disclosure. Various alternative embodiments, examples, and operational techniques will become apparent to those skilled in the art from the disclosure.

In addition, although not particularly mentioned in the embodiments described above, a program for executing each processing performed by the encoding device 1 and the decoding device 3 described above on a computer may be provided. In addition, such a program may be recorded on a computer readable medium. If the computer readable medium is used, it is possible to install such a program on the computer. Here, the computer readable medium on which such a program is recorded may be a non-volatile recording medium. The non-volatile recording medium is not particularly limited, but may be, for example, a recording medium such as a CD-ROM or a DVD-ROM.

Alternatively, a chip configured by a memory for storing a program for realizing at least some functions in the encoding device 1 and the decoding device 3 described above and a processor for executing the program stored in the memory may be provided.

What is claimed is:

1. An encoding device configured to divide an original image of a frame unit constituting a moving image into blocks and encode the blocks, the encoding device comprising:
    a list generator configured to generate a list including motion vector candidates of a block to be encoded, based on a divided shape of the block to be encoded, and a divided shape and a motion vector of an adjacent block adjacent to the block to be encoded; and
    an encoder configured to encode a motion vector of the block to be encoded, based on the list,
    wherein the list generator is configured so as not to add, to the list, a motion vector of a same hierarchy adjacent block which is a same hierarchy block adjacent to the block to be encoded, when the block to be encoded and the same hierarchy adjacent block are integrable, and the same hierarchy block is a block that has the same width and height as the block to be encoded and has existed in the same block as the block to be encoded before being finally divided.

2. The encoding device according to claim 1, wherein when a residual signal is not transmitted in the block to be encoded, the residual signal is not transmitted in the same hierarchy adjacent block, and the block to be encoded and the same hierarchy adjacent block are integrable, the list generator is configured so as not to add the motion vector of the same hierarchy adjacent block to the list.

3. The encoding device according to claim 2, wherein when the residual signal is not transmitted in the block to be encoded, the residual signal is not transmitted in the same hierarchy adjacent block, the residual signal is transmitted in a same hierarchy non-adjacent block which is a same hierarchy block not adjacent to the block to be encoded, the same hierarchy adjacent block and the same hierarchy non-adjacent block are integrable, and the motion vector of the same hierarchy adjacent block and a motion vector of the same hierarchy non-adjacent block are the same as each other, the list generator is configured so as not to add the motion vector of the same hierarchy non-adjacent block to the list.

4. An encoding device configured to divide an original image of a frame unit constituting a moving image into blocks and encode the blocks, the encoding device comprising:
    a determiner configured to determine whether or not a residual signal is transmitted in a block to be encoded, based on a divided shape and a motion vector of the block to be encoded, and a divided shape and a motion vector of an adjacent block adjacent to the block to be encoded; and
    an encoder configured to encode the motion vector of the block to be encoded without encoding information indicating that the residual signal is not transmitted in the block to be encoded, based on the determination,
    wherein when the block to be encoded and a same hierarchy adjacent block which is a same hierarchy block adjacent to the block to be encoded, are integrable, the residual signal is not transmitted in the same hierarchy adjacent block, and the motion vector of the block to be encoded and a motion vector of the same hierarchy adjacent block are the same as each other, the determiner is configured to determine that the residual signal is transmitted in the block to be encoded, and the same hierarchy block is a block that has the same width and height as the block to be encoded and has existed in the same block as the block to be encoded before being finally divided.

5. A decoding device configured to divide an original image of a frame unit constituting a moving image into blocks to be encoded and decode the blocks, the decoding device comprising:

a list generator configured to generate a list including motion vector candidates of a block to be encoded, based on a divided shape of the block to be encoded, and a divided shape and a motion vector of an adjacent block adjacent to the block to be encoded; and an inter-predictor configured to generate a predictive image based on a motion vector of the block to be encoded extracted based on the list, wherein the list generator is configured so as not to add, to the list, a motion vector of a same hierarchy adjacent block which is a same hierarchy block adjacent to the block to be encoded, when the block to be encoded and the same hierarchy adjacent block, are integrable, and the same hierarchy block is a block that has the same width and height as the block to be encoded and has existed in the same block as the block to be encoded before being finally divided.

6. The decoding device according to claim 5, wherein when a residual signal is not transmitted in the block to be encoded, the residual signal is not transmitted in the same hierarchy adjacent block, and the block to be encoded and the same hierarchy adjacent block are integrable, the list generator is configured so as not to add the motion vector of the same hierarchy adjacent block to the list.

7. The decoding device according to claim 6, wherein when the residual signal is not transmitted in the block to be encoded, the residual signal is not transmitted in the same hierarchy adjacent block, the residual signal is transmitted in a same hierarchy non-adjacent block which is a same hierarchy block not adjacent to the block to be encoded, the same hierarchy adjacent block and the same hierarchy non-adjacent block are integrable, and the motion vector of the same hierarchy adjacent block and a motion vector of the same hierarchy non-adjacent block are the same as each other, the list generator is configured so as not to add the motion vector of the same hierarchy non-adjacent block to the list.

8. A decoding device configured to divide an original image of a frame unit constituting a moving image into blocks to be encoded and decode the blocks, the decoding device comprising:

a decoder configured so as not to decode information indicating that a residual signal is not transmitted in the block to be encoded;

a determiner configured to determine whether or not the residual signal is transmitted in the block to be encoded, based on a divided shape and a motion vector of the block to be encoded, and a divided shape and a motion vector of an adjacent block adjacent to the block to be encoded; and a decoded image generator configured to generate a decoded image of the block to be encoded, based on the determination, wherein when the block to be encoded and a same hierarchy adjacent block which is a same hierarchy block adjacent to the block to be encoded, are integrable, the residual signal is not transmitted in the same hierarchy adjacent block, and the motion vector of the block to be encoded and a motion vector of the same hierarchy adjacent block are the same as each other, the determiner is configured to determine that the residual signal is transmitted in the block to be encoded, and the same hierarchy block is a block that has the same width and height as the block to be encoded and has existed in the same block as the block to be encoded before being finally divided.

* * * * *